United States Patent
Patel et al.

(10) Patent No.: US 8,362,728 B2
(45) Date of Patent: Jan. 29, 2013

(54) ROTOR POSITION DETECTION AT STANDSTILL AND LOW SPEEDS USING A PMG TO OPERATE A WOUND FIELD SYNCHRONOUS MACHINE

(75) Inventors: Dhaval Patel, Loves Park, IL (US);
Albert L. Markunas, Roscoe, IL (US);
Michael C. Harke, Madison, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 339 days.

(21) Appl. No.: 12/882,379

(22) Filed: Sep. 15, 2010

(65) Prior Publication Data

US 2012/0062161 A1 Mar. 15, 2012

(51) Int. Cl.
*H02P 1/04* (2006.01)
*H02P 6/18* (2006.01)

(52) U.S. Cl. ............... 318/400.33; 318/700; 318/712; 318/723

(58) Field of Classification Search ............. 318/499.33, 318/432, 434, 439, 700, 712, 723
See application file for complete search history.

(56) References Cited

U.S. PATENT DOCUMENTS

| | | | |
|---|---|---|---|
| 5,495,162 A | 2/1996 | Rozman et al. | |
| 5,594,322 A | 1/1997 | Rozman et al. | |
| 5,747,971 A | 5/1998 | Rozman et al. | |
| 6,646,409 B2 | 11/2003 | Won et al. | |
| 6,967,461 B1 * | 11/2005 | Markunas et al. | 318/700 |
| 7,034,497 B2 * | 4/2006 | Markunas et al. | 318/400.33 |
| 7,072,790 B2 | 7/2006 | Hu et al. | |
| 7,132,816 B1 | 11/2006 | Markunas et al. | |
| 7,265,507 B1 | 9/2007 | Markunas | |
| 7,583,046 B2 | 9/2009 | Maddali et al. | |
| 7,687,928 B2 * | 3/2010 | Taneja et al. | 290/36 R |
| 8,004,222 B2 * | 8/2011 | Maddali et al. | 318/400.34 |
| 2006/0061319 A1 * | 3/2006 | Markunas et al. | 318/712 |
| 2008/0315822 A1 * | 12/2008 | Maddali et al. | 318/700 |
| 2010/0072930 A1 * | 3/2010 | Maddali et al. | 318/400.34 |
| 2010/0295301 A1 * | 11/2010 | Huang et al. | 290/31 |

* cited by examiner

*Primary Examiner* — Thomas Dougherty
(74) *Attorney, Agent, or Firm* — Carlson, Gaskey & Olds PC

(57) ABSTRACT

A method of operating a WFSM in a motoring mode determines a relative position of a PMG rotor with respect to the WFSM rotor. A PMG is coupled to the WFSM via a coupling shaft. A relative difference between the WFSM rotor position and the PMG rotor position is determined based on carrier injection sensorless ("CIS") stimulation signals. The relative difference between the PMG rotor and the WFSM main machine in conjunction with the PMG rotor position is used to determine the WFSM rotor position during motoring operation of the main machine. A stator of the WFSM main machine is energized to maintain operation of the WFSM in response to the detected main rotor position.

20 Claims, 3 Drawing Sheets

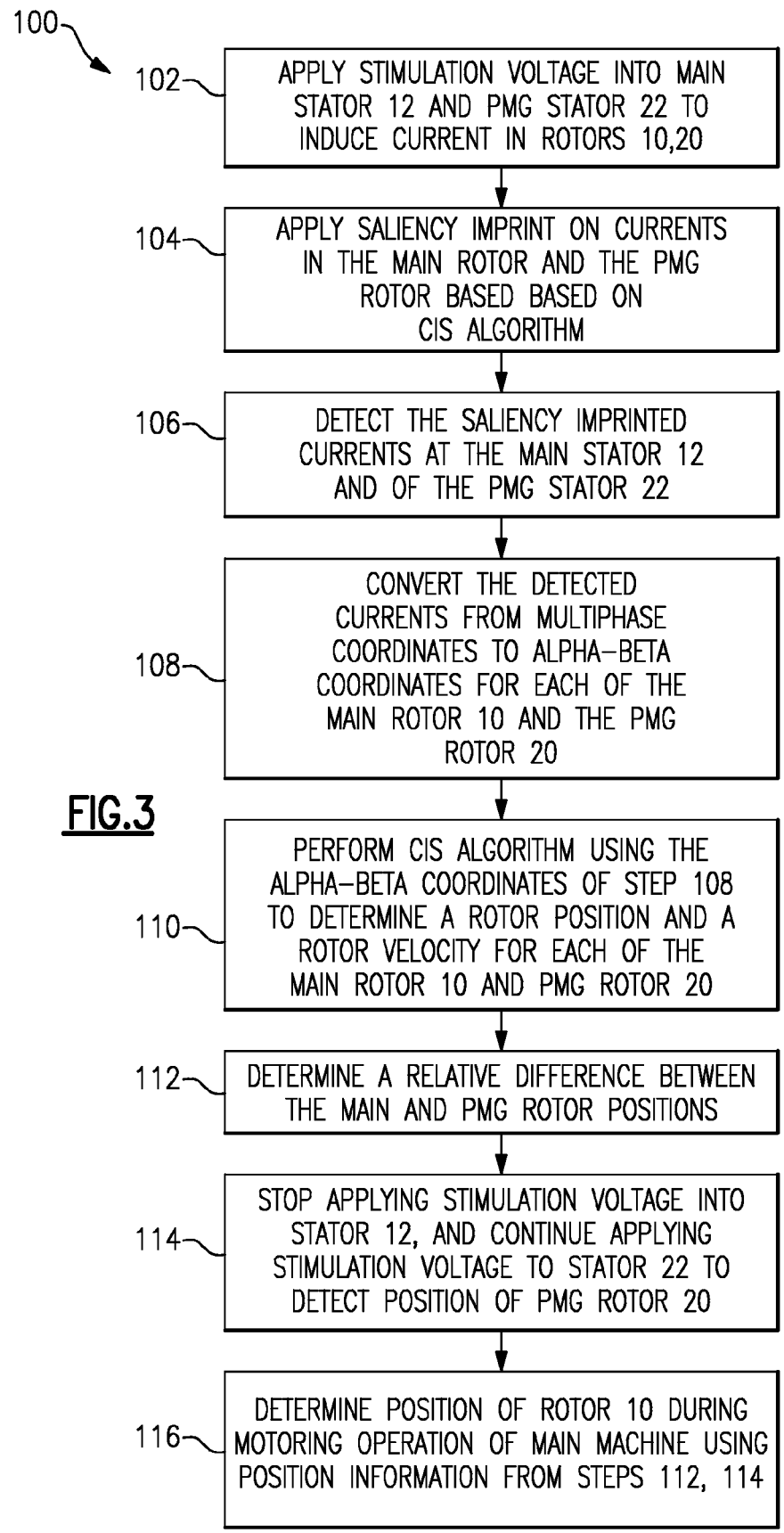

ROTOR POSITION DETECTION AT STANDSTILL AND LOW SPEEDS USING A PMG TO OPERATE A WOUND FIELD SYNCHRONOUS MACHINE

BACKGROUND

This disclosure relates to rotor angular position sensing for wound field synchronous machines ("WFSM"), and more particularly to a method of position sensorless operation of a wound field synchronous machine as a starter or motor using a carrier injection sensorless ("CIS") approach with permanent magnet generator ("PMG").

For aeronautical applications a WFSM is ideal for electromechanical power transfer systems. The WFSM may serve as both a starter/motor and generator when mechanically coupled to a variable speed prime mover, such as gas turbine engine. A typical WFSM includes a rotor which contains a main field rotor winding which is provided with electrical current from an excitation system. The excitation system consists of a exciter stator and exciter rotor. Both rotors are fixed to a shaft which is driven to rotate by a prime mover. The exciter rotor rotates adjacent an exciter stator, and the main field winding rotates adjacent a main stator.

Operation of a WFSM in generate mode constitutes a variable speed prime mover to drive the rotor shaft of the WFSM. The rotor shaft also includes or is coupled to a PMG rotor. During operation as a generator, the PMG is used to provide power to drive the excitation system and to power the controllers.

Operation of a WFSM in the motor mode constitutes a variable speed motor drive utilizing a solid-state power converter to process typically high potential direct current ("DC") electric power to provide variable frequency AC power input to the WFSM. For operation of a WFSM as a variable speed motor drive it is necessary to know the rotational position of a WSFM main rotor to control the solid-state power converter to meet motor performance requirements.

Previous systems used position sensors (e.g., resolvers) to determine rotor position, which is an undesirable addition due to an increase in weight, size and complexity of the overall system. More recently other systems have used a back electromotive force ("EMF") method to determine rotor position. However, the back-EMF method can not be used at standstill or low speeds due to insufficient back-EMF generated in the WFSM.

One method uses a carrier injection sensorless ("CIS") algorithm to estimate the position of the rotor of a WFSM. A high frequency excitation signal with an electrical current or potential rotating waveform is applied to the WFSM directly at a high enough frequency that it sweeps around the stator faster than the rotor is turning, thus "viewing" the rotor from all angles. This "viewing" is possible by measuring the resulting rotating current or potential waveform, which contains information about the rotor due to rotor position dependent differences in the equivalent magnetic circuit of the WFSM. This technique works with any WFSM that has rotor saliencies that result in a change in impedance as seen at the stator windings to the high frequency excitation signal. This method requires that both the high frequency excitation and variable frequency AC power input be injected into the WFSM at the same time in order to meet motor performance requirements. The variable frequency AC power input will interfere in the operation of CIS and requires the high frequency excitation signal amplitude to be increased in order to meet motor mode requirements. In most cases this total input to the unit, variable frequency AC power input and high frequency and high frequency excitation signal, will equal or exceed the WFSM ratings, which may lead to reduced machine life and reliability problems.

One method uses CIS applied to the PMG to determine WFSM rotor position. However, this method requires that the number of poles of the PMG is a power of 2 submultiple (e.g., 1, 2, 4, etc.) of the number of poles of the WFSM main rotor, which can lead to an oversized PMG. This method also requires a PMG rotor to be precisely mechanically calibrated to the WFSM main rotor.

SUMMARY

A method of operating a WFSM in a motoring mode determines a relative position of a PMG rotor with respect to the WFSM rotor. A PMG is coupled to the WFSM via a coupling shaft. A relative difference between the WFSM rotor position and the PMG rotor position is determined based on carrier injection sensorless ("CIS") stimulation signals. The relative difference between the PMG rotor and the WFSM main machine in conjunction with the PMG rotor position is used to determine the WFSM rotor position during motoring operation of the main machine. A stator of the WFSM main machine is energized to maintain operation of the WFSM in response to the detected main rotor position.

These and other features of the present invention can be best understood from the following specification and drawings, the following of which is a brief description.

BRIEF DESCRIPTION OF THE DRAWINGS

FIG. 3 schematically illustrates a method of operating a WFSM main machine of the system of FIG. 1 a motoring mode.

DETAILED DESCRIPTION

Figure 1:
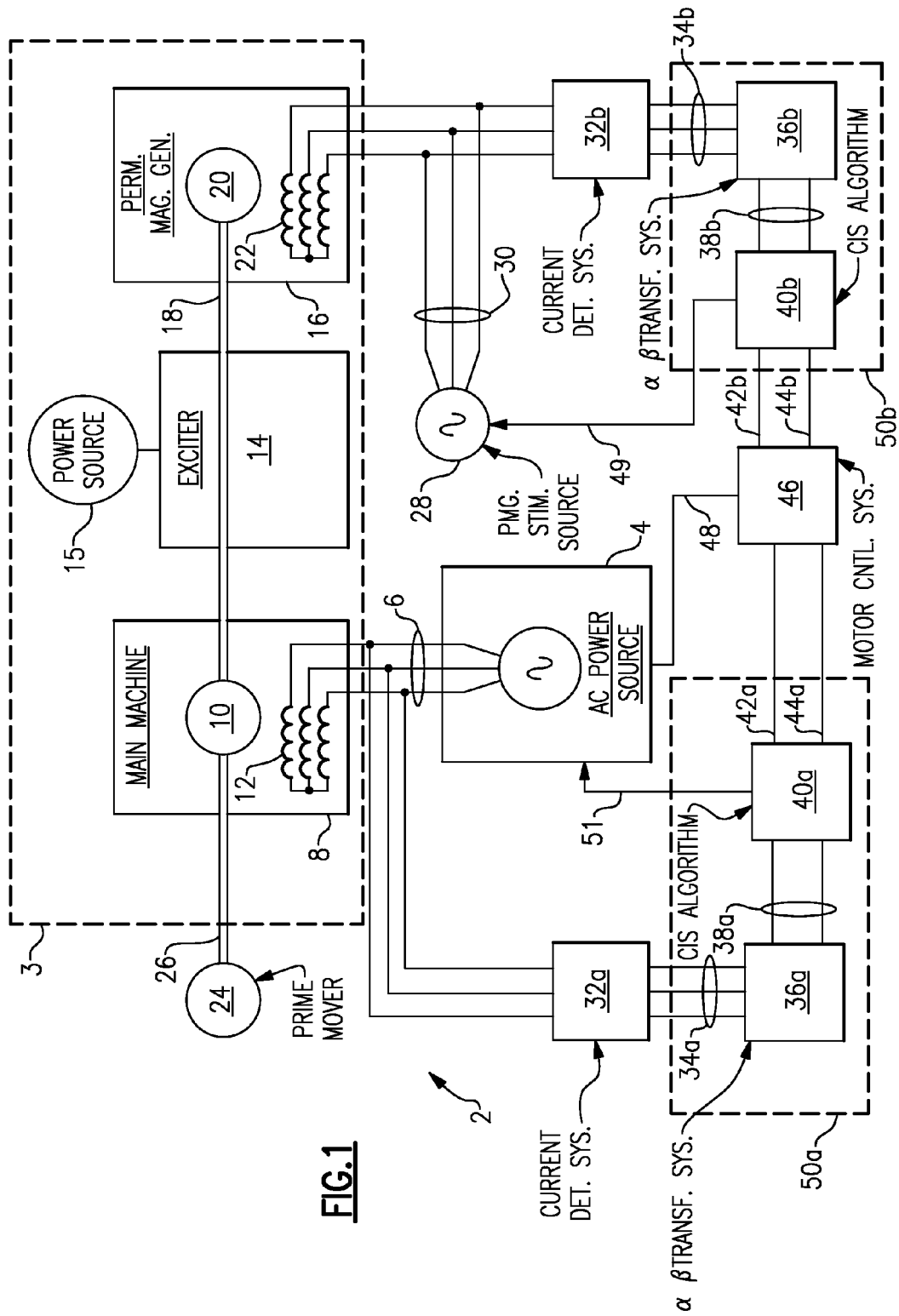
FIG. 1 schematically illustrates an electromechanical power transfer system.

FIG. 1 schematically illustrates an example electromechanical power transfer system 2, in which a starter/generator ("S/G") 3 (e.g. a brushless starter/generator) is operable to rotationally drive a prime mover 24 about a shaft 26. The S/G 3 is a particular form of a WFSM constituting a main machine 8, exciter 14 and a PMG 16 all coupled via a rotatable coupling shaft 18. The prime mover 24 could include a gas turbine engine, for example, or any number of devices requiring rotation for operation. As will be described below, in the system 3, saliencies in a main rotor 10 and in a PMG rotor 20 enable detection systems 50a-b to detect specific harmonic currents containing rotor position information and to determine a relative difference between the position of the WFSM main rotor 10 relative to the position of the PMG rotor 20, without the need for a position sensor. This relative difference may then be used during operation of the S/G 3 to determine the position of the main rotor 10.

The main machine 8 includes a main rotor 10 and a main stator 12. During initialization of the CIS position sensing system (e.g. modules 40a-b), the main stator 12 receives CIS stimulation signals from an AC power source 4 via a power bus 6. During CIS stimulation AC power source 4 is controlled by the CIS algorithm 40a via output 51. A motor control system 46 is operable to control the power source 4 via at least one output 48. In one example embodiment, the at least one output 48 may include the 6 pulse width modulated ("PWM") signals provided to gate drives of a 3-phase inverter. Once the CIS initialization is complete (i.e. method 100 of FIG. 3 is complete) the main stator 12 receives multiphase AC electric power from the AC power source 4 via a power bus 6 and the S/G 3 produces the mechanical power required to start the prime mover 24. The exciter 14 receives energy from power source 15 and uses that energy to provide a magnetic field in the main rotor 10 required for operation of the WSFM main machine 8.

Similarly, the PMG 16 includes the rotor 20 and a stator 22. The rotor 20 is coupled to the coupling shaft 18 and is rotatable about the coupling shaft 18. In one example the main rotor 10 and the PMG rotor 20 rotate at the same angular velocity. However, it is understood that this is only an example, and that differing angular velocities could be possible. During both initialization and operation of the CIS position sensing system (e.g. modules 40*a-b*), the stator 22 receives CIS stimulation energy from PMG stimulation source 28, which connects to the stator 22 via a signal bus 30. The PMG stimulation source is controlled by output 49 of carrier injection sensorless ("CIS") module 40*b*. Although the stators 12, 22 are illustrated as having three phases of current, it is understood that other numbers of phases greater than or equal to three would be possible.

Figure 2:
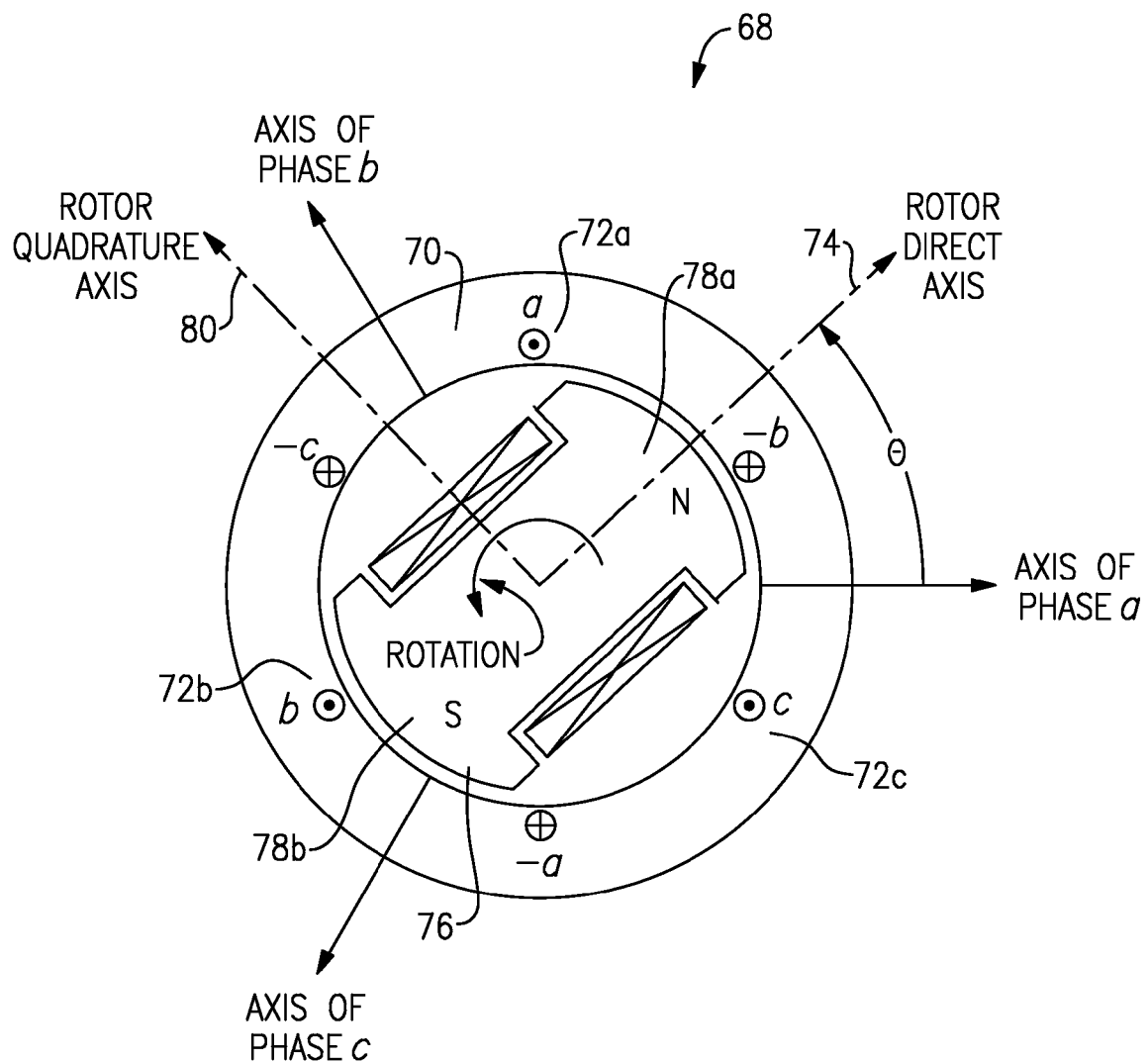
FIG. 2 illustrates an example WFSM including rotor saliency, and illustrates a direct axis and a quadrature axis of the WFSM.

FIG. 2 illustrates an example 3-phase, 2-pole WFSM main machine 68 having a rotor 76 and a stator 78, and including rotor saliency. The example stator 70 has a smooth magnetic structure with three phase windings 72*a-c*, represented as single windings. Example rotor 76 has two poles: one "north" pole 78*a*, and one "South" pole 78*b*. A direct rotor axis 74 is aligned with the rotor "North" pole and rotates with the rotor 76. A rotor quadrature axis ("q-axis") 80 is centered in a rotor interpolar space and is displaced 90 degrees from the rotor 76 in the 2-pole example of FIG. 2. The q-axis 80 also rotates with the rotor 76 and is ahead of the rotor 76 as shown in FIG. 2. CIS stimulation signals applied to the stator of a salient pole synchronous machine (e.g. the WFSM 68 of FIG. 2) or a PMG produces a magnetic field that rotates relative to the rotor 76, encountering a variable magnetic reluctance that is dependent on rotor position. This rotor saliency induced variable reluctance produces a stator 78 currents at select harmonics of the CIS stimulation frequency that is a function of rotor position. Rotor saliency can be achieved by selecting a rotor 76 that has a non-uniform geometry as illustrated in FIG. 2, typical of a WFSM. Although the rotor 76 is illustrated as having geometric saliency, it is understood that rotor saliency can also be achieved by applying a CIS stimulation voltage of sufficient magnitude to magnetically saturate the WFSM main machine 68, which may be applied to a PMG.

FIG. 3 schematically illustrates a method 100 of operating the main machine 8 of FIG. 1 based on the PMG 16 of FIG. 1. In one example the PMG 16 has a high pole count (e.g. 18 poles). Of course this is only an example, and other pole counts would be possible. CIS stimulation voltages are applied to the main stator 12 and the PMG stator 22 to induce current in the rotors 10, 20 (step 102). As discussed above, rotor saliency may be achieved either by rotor geometry or by applying a CIS stimulation voltage of sufficient magnitude from one of the power sources 4, 28 to the rotors 10, 20 so as to magnetically saturate associated magnetic flux paths of the rotors 10, 20. In one example the stimulation signals of step 102 are applied when the rotors 10, 20 corresponding to stators 12, 22 are at a standstill or are rotating at low speeds (e.g. speeds at which the prior art back-EMF method would not be effective). The saliency of the rotors 10, 20 applies a detectable imprint on stator currents of the stators 12, 22 (step 104)

Current detection systems 32*a-b* detect CIS-induced saliency-imprinted currents at stators 12, 22 along their respective buses 6, 30 such that the detection system 32*a* detects stator currents of the stator 12, and detection system 32*b* detects stator currents of the stator 22 (step 106). In one example the detected harmonic stator current is either a first harmonic current or a second harmonic current. Each detection system 32*a-b* outputs its respective detected harmonic currents along its respective output bus 34*a-b*.

Alpha-beta coordinate transformation systems 36*a-b* receive the saliency-imprinted currents along buses 34*a-b*, and convert the detected currents from multiphase coordinates to alpha-beta coordinates for each of the main rotor 10 and the PMG rotor 20 (step 108).

Carrier injection sensorless ("CIS") modules 40*a-b* receive the alpha-beta coordinate currents along output lines 38*a-b*, and perform a CIS algorithm to determine a rotor position for each of the main rotor 10 and the PMG rotor 20 (step 110). In one example the CIS algorithm is performed according to the steps described in U.S. Pat. No. 7,034,497 to Markunas et al, entitled "Carrier Injection Sensorless Control of Aircraft Variable Frequency Wound Field Synchronous Starter Generators" However, it is possible that the CIS modules 40*a-b* could perform other CIS algorithms.

In one example the CIS modules 40*a-b* may rotate the alpha-beta coordinate harmonic stator current coordinates 34 from a negative first harmonic to a positive second harmonic rotating reference frame. In one example the CIS modules 40*a-b* perform a north-south pole determination to determine a polarity of the detected harmonic current of the WFSM rotor according to the steps described in U.S. Pat. No. 6,967,461 to Markunas et al., entitled "North-South Pole Determination for Carrier Injection Sensorless Position Sensing Systems."

Once the position of poles of each of the rotors 10, 20 are determined, and the absolute position of a "North" pole of main rotor 10 is determined, a relative difference between the position of the main rotor 10 and that of the PMG rotor 20 may be determined (step 112).

Once the relative rotor position difference has been determined (step 112), the CIS algorithm 40*a* and the CIS stimulation signals along output 51 to the main stator 12 may be turned off, and the CIS algorithm 40*b* and the CIS stimulation signals along output 49 to the PMG stator 22 are kept active to provide PMG rotor 20 position information during a motoring mode of the WFSM (step 114). The position information from step 114 in conjunction with the relative rotor position difference of step 112 may be used to determine the absolute position of the main rotor 10 during operation of the S/G 3 (step 116). In one example the steps 102-112 are performed every time the electromechanical power transfer system 3 is initialized. In one example, if the WFSM enters a generator mode then both of the CIS algorithms 40*a-b* are turned OFF.

In one example the alpha-beta coordinate transformation systems 36*a-b* and CIS modules 40*a-b* correspond to one or more digital signal processors ("DSPs") 50*a-b*. Although two DSPs 50*a-b* are illustrated in FIG. 1, it is understood that a single DSP, or additional DSPs could be used. In one example the prime mover 24 is a gas turbine engine, and the DSPs 50*a-b* are part of an S/G 3 controller.

Unlike the prior art, in the system 2, the PMG rotor 20 is not required to have a quantity of poles that is a submultiple of the number of poles of the WFSM rotor 10. In the system 3, the PMG rotor 20 may have fewer poles, the same number of poles, or a greater number of poles than the WFSM rotor 10.

Also, unlike the prior art, in the system 2, the PMG rotor 20 is not required to be mechanically timed to the WFSM rotor 10. In the system 2, the PMG rotor 20 may be mechanically coupled to the WFSM rotor 10 without any timing considerations.

Also, unlike the prior art, a position sensor is not required to detect the position of the WFSM rotor 10. Thus, the system 2 may be described as position sensorless. However, it is understood that the absence of a position sensor is not required, and that one could use a position sensor in addition to performing the steps of the method 100.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of operating of a wound field synchronous machine in a motoring mode, comprising:
   determining a position of both a main rotor of a wound field synchronous main machine ("WFSM") and a permanent magnet generator ("PMG") rotor based on carrier injection sensorless ("CIS") stimulation signals, the PMG being coupled to the main rotor via a coupling shaft;
   determining a relative difference between the main rotor position and the PMG rotor position;
   using the relative difference to determine the main rotor position from the PMG rotor position during operation of the WFSM; and
   energizing a stator of the WFSM main machine to maintain operation of the WFSM in response to the detected main rotor position.

2. The method of claim 1, wherein said step of determining a relative difference between the main rotor position and the PMG rotor position determines a relative difference between a north pole position of the main rotor and a pole position of the PMG rotor.

3. The method of claim 1, wherein said step of determining a position of both a main rotor of wound field synchronous machine ("WFSM") and a permanent magnet generator ("PMG") rotor includes the steps of:
   A) applying multiphase AC voltage stimulation signals of a selected frequency into a stator of the WFSM main machine and a stator of the PMG to induce current on a main machine rotor and a PMG rotor, the stimulation signals being applied to the main machine stator and the PMG stator while the main machine rotor and the PMG rotor are at a standstill;
   B) applying a saliency imprint on the current in the main rotor and the PMG rotor;
   C) detecting the saliency-imprinted current signals at the WFSM stator and the PMG stator;
   D) converting in a controller the detected current signals from multiphase coordinates to alpha-beta coordinates for each of the WFSM main machine and the PMG; and
   E) performing in a controller a carrier injection sensorless ("CIS") algorithm using the alpha-beta coordinates of said step (D) to determine a rotor position for each of the WFSM main machine and the PMG.

4. A method of calibrating a wound field synchronous machine ("WFSM"), comprising:
   A) applying multiphase AC voltage stimulation signals of a selected frequency into a main stator of a wound field synchronous machine ("WFSM") and a stator of a permanent magnet generator ("PMG") to induce current on the main rotor and the PMG rotor, the PMG being coupled to the WFSM main rotor via a coupling shaft;
   B) applying a saliency imprint the current signals in the WFSM main rotor and the PMG rotor;
   C) detecting the saliency-imprinted current signals at the WFSM stator and the PMG stator;
   D) converting in a controller the detected current signals from multiphase coordinates to alpha-beta coordinates for each of the WFSM main machine and the PMG;
   E) performing in a computer a carrier injection sensorless ("CIS") algorithm using the alpha-beta coordinates of said step (D) to determine a rotor position for each of the WFSM main machine and the PMG; and
   F) determining in a computer a relative difference between the main rotor and PMG rotor positions.

5. The method of claim 4, including:
   using the relative difference of said step (F) and the PMG rotor position of said step (E) to determine the WFSM main rotor position during motoring operation of the WFSM main machine, and wherein the determined main rotor position includes a position of a North pole of the main rotor.

6. The method of claim 4, wherein said steps (A)-(F) are selectively repeated every time that the WFSM is initialized, and wherein step (F) includes stopping application of the AC voltage stimulation signals of said step (A) to the main stator of the WFSM.

7. The method of claim 4, wherein said step (B) includes:
   selecting at least one of the WFSM main rotor or the PMG rotor to have a non-uniform geometry.

8. The method of claim 4, wherein said step (B) includes:
   magnetically saturating at least one of the WFSM main rotor or the PMG rotor by applying a predefined voltage to the stator for which magnetic saturation is desired.

9. The method of claim 4, wherein said step (B) includes:
   selecting a rotor having a non-uniform geometry as the rotor for one of the WFSM main machine or the PMG; and
   magnetically saturating the rotor of the other of the WFSM main machine or PMG.

10. The method of claim 4, wherein each of the detected saliency-imprinted currents from said step (C) includes at least one of a first harmonic current or a second harmonic current.

11. The method of claim 4, wherein said step (E) includes:
   performing a north-south pole determination to determine a polarity of the detected saliency-imprinted current of the WFSM main rotor.

12. The method of claim 4, the WFSM having both a generator mode and a motor mode, the method including:
   G) deactivating the both AC voltage signals of said step (A) applied to the main stator and the main stator CIS algorithm in response to the WFSM being operating in a generator motor mode or in response to a shutdown of the main machine.

13. The method of claim 4, wherein the WFSM main rotor and the PMG rotor have different numbers of poles.

14. The method of claim 12, wherein the PMG rotor has a number of poles that is a multiple of the number of poles on the WFSM main rotor.

15. An electromechanical power transfer system, comprising:
   a wound field synchronous machine ("WFSM") operable to rotatably drive a shaft, the WFSM having an associated main machine, the main machine having a main rotor and a main stator;

a permanent magnet generator ("PMG") operable to co-rotate with the WFSM main machine along a coupling shaft, the PMG having an associated PMG rotor and a PMG stator;

at least one current detection system operable to detect multiphase coordinates of currents of each of the WFSM main stator and the PMG stator, wherein the currents contain selected harmonics of a carrier injection sensorless ("CIS") frequency and contain rotor position information caused by saliency of the WFSM main rotor and the PMG rotor; and at least one digital signal processor operable to convert the multiphase coordinates of the currents to alpha-beta coordinates, operable to perform the CIS algorithm to determine a position and angular velocity of the WFSM main rotor and the PMG rotor, and operable to determine a relative difference between the position and angular velocity of the WFSM main rotor and the PMG rotor.

16. The system of claim 15, wherein the at least one digital signal processor is also operable to use the determined relative difference to determine the WFSM main rotor position from the PMG rotor position during operation of the WFSM.

17. The system of claim 15, including:
a prime mover that is rotatably driven about the shaft, wherein the prime mover is a gas turbine engine.

18. The system of claim 15, including:
a first voltage source operable to energize the WFSM main stator; and
a second voltage source operable to energize the PMG stator.

19. The system of claim 18, including:
a motor controller operable to control the first voltage source and the second voltage source.

20. The system of claim 15, wherein at least one of the WFSM main rotor or the PMG rotor has a non-uniform geometry to induce rotor saliency, and wherein the WFSM main rotor and the PMG rotor have different numbers of poles.

\* \* \* \* \*